(12) United States Patent
Melnyk et al.

(10) Patent No.: US 9,749,713 B2
(45) Date of Patent: Aug. 29, 2017

(54) BUDGET ENCODING

(75) Inventors: Miguel Melnyk, Champaign, IL (US); Robert Kidd, Urbana, IL (US); Joseph Sestrich, Champaign, IL (US); Jeremy Tidemann, Champaign, IL (US); Kartik Ayyar, Sunnyvale, CA (US); Frederick Koopmans, Oakland, CA (US); Andrew Penner, Champaign, IL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 1654 days.

(21) Appl. No.: 12/580,212

(22) Filed: Oct. 15, 2009

(65) Prior Publication Data

US 2011/0090953 A1     Apr. 21, 2011

(51) Int. Cl.
| | |
|---|---|
| H04N 21/854 | (2011.01) |
| H04L 29/06 | (2006.01) |
| H04N 19/176 | (2014.01) |
| H04N 19/70 | (2014.01) |
| H04N 19/15 | (2014.01) |
| H04N 19/61 | (2014.01) |
| H04N 19/124 | (2014.01) |
| H04N 19/40 | (2014.01) |

(52) U.S. Cl.
CPC ... *H04N 21/85406* (2013.01); *H04L 65/4092* (2013.01); *H04N 19/124* (2014.11); *H04N 19/15* (2014.11); *H04N 19/176* (2014.11); *H04N 19/40* (2014.11); *H04N 19/61* (2014.11); *H04N 19/70* (2014.11)

(58) Field of Classification Search
CPC .............................. H04N 7/26; H04N 19/781

USPC ........................................ 375/240.01, 240.03
See application file for complete search history.

(56) References Cited

U.S. PATENT DOCUMENTS

| | | | |
|---|---|---|---|
| 2002/0110193 A1 | 8/2002 | Yoo et al. | |
| 2002/0181595 A1 | 12/2002 | Obata et al. | |
| 2003/0095594 A1 | 5/2003 | Laksono et al. | |
| 2004/0141732 A1 | 7/2004 | Sugiyama et al. | |

(Continued)

FOREIGN PATENT DOCUMENTS

| | | |
|---|---|---|
| CN | 1235428 A | 11/1999 |
| CN | 1631041 A | 6/2005 |

(Continued)

OTHER PUBLICATIONS

Notification of Transmittal of the International Search Report and the Written Opinion for International application No. PCT/US2010/002762, mailed May 19, 2011, 18 pgs.

(Continued)

*Primary Examiner* — Yulin Sun
(74) *Attorney, Agent, or Firm* — Finnegan, Henderson, Farabow, Garrett & Dunner, LLP

(57) ABSTRACT

A method includes receiving streaming media data having a media frame and a frame index referencing the media frame; allocating a frame budget for an output media frame by estimating a frame size of the output media frame based on the frame index; generating the output media frame in real-time by processing the media frame based on first processing parameters and, if the allocated frame budget is greater than a frame size of the processed media frame, padding the processed media frame; and providing the output media frame.

17 Claims, 12 Drawing Sheets

(56) References Cited

U.S. PATENT DOCUMENTS

| | | |
|---|---|---|
| 2005/0152449 A1 | 7/2005 | Nemiroff |
| 2005/0220188 A1 | 10/2005 | Wang |
| 2005/0232354 A1 | 10/2005 | Chen |
| 2008/0065965 A1* | 3/2008 | Hannuksela ............... 714/776 |
| 2009/0106356 A1 | 4/2009 | Brase et al. |
| 2009/0213930 A1 | 8/2009 | Ye et al. |
| 2009/0232220 A1 | 9/2009 | Neff et al. |
| 2010/0061448 A1* | 3/2010 | Zhou et al. .............. 375/240.03 |
| 2010/0166060 A1 | 7/2010 | Ezure et al. |
| 2010/0254451 A1 | 10/2010 | Melnyk et al. |
| 2012/0314764 A1 | 12/2012 | Tidemann et al. |

FOREIGN PATENT DOCUMENTS

| | | |
|---|---|---|
| EP | 1727371 A1 | 11/2006 |
| EP | 2061241 A1 | 5/2009 |
| WO | WO 97/37322 | 10/1997 |
| WO | WO 2008/098249 | 8/2008 |
| WO | WO 2009/105732 | 8/2009 |
| WO | WO 2010/117432 A2 | 10/2010 |

OTHER PUBLICATIONS

Notification of Transmittal of International Preliminary Report on Patentability for International Application No. PCT/US2010/002762, mailed Apr. 26, 2012, 10 pgs.

International Search Report and the Written Opinion for International Application No. PCT/US2010/002762, mailed May 19, 2011, 18 pgs.

International Preliminary Report on Patentability for International Application No. PCT/US2010/002762, mailed Apr. 26, 2012, 10 pgs.

Sullivan, G.J., et al., "Rate-Distortion Optimization for Video Compression," IEEE Signal Processing Magazine, vol. 15, No. 6, Nov. 1, 1998, pp. 74-90.

International Search Report and Written Opinion for International Application No. PCT/US2010/000988, mailed Nov. 19, 2010, 24 pages.

Bibliographic information for Japanese Publication No. JP 2011514056, published Apr. 28, 2011 for Qualcomm, Inc. (2 pgs).

Communication pursuant to Article 94(3) EPC for European Application No. 10713807.5, Oct. 26, 2012, 7 pgs.

Nakajima, Y, et al., "Rate Conversion of MPEG Coded Video by Re-Quantization Process," Proceedings of the International Conference on Image Processing (ICIP), Washington, D.C., Oct. 23-26, 1995, IEEE Comp. Soc. Press, US, vol. 3, Oct. 23, 1995, pp. 408-411.

Al-Khrayshah, M., "A Real-Time SNR Scalable Transcoder for MPEG-2 Video Streams," Eindhoven University of Technology, Master Informatica Computer Science Engineering (CSE) Afstudeerverslagen; Jan. 1, 2009, pp. 1-80.

Puri, A, et al. "Motion-Compensated Video Coding with Adaptive Perceptual Quantization," IEEE Transactions on Circuits and Systems for Video Technology, IEEE Service Center, vol. 1, No. 4, Dec. 1, 1991, pp. 351-361.

Lei, Z, et al. "Rate Adaptation Transcoding for Precoded Video Streams, " ACM 2002, Dec. 1, 2002-Dec. 6, 2002, pp. 127-135.

International Search Report and the Written Opinion for International Application No. PCT/US2012/041691, mailed Oct. 5, 2012, 20 pages.

English translation and First Chinese Office Action for Application No. 201080057336.1 dated Feb. 12, 2015; 33 pages.

English translation and Second Chinese Office Action for Application No. 201080057336.1 dated Sep. 23, 2015; 31 pages.

English translation and First Chinese Office Action for Application No. 201280039090.4 dated Aug. 1, 2016; 25 pages.

Summons to Attend Oral Proceedings for European Application No. 10776446.6; mailed Sep. 22, 2016; 7 pages.

* cited by examiner

BUDGET ENCODING

BACKGROUND INFORMATION

MP4 (known as "MPEG-4 Part 14", or "ISO/IEC 14496-14:2003") is a multimedia container file format standard specified as a part of MPEG-4. It is used to store digital audio and video streams and other data such as subtitles and still images. Mainly designed for video storage, MP4 is also used by Internet Video websites to transfer video content in a pseudo-streaming fashion. This is, a video player downloads the clip and plays the video content as it becomes available.

For example, an MP4 file 100 in FIG. 1A is made up of a hierarchy of objects, referred to as boxes including, but not limited to, boxes 110 and 120. Each box is a contiguous range of bytes within the file. Each box may be identified by a four character box type within the file. Two boxes at the top of the hierarchy are most relevant here, i.e., a movie box (type moov 110) and a media data box (type mdat 120). Moov box 110 includes all file information 112 describing MP4 file 100. Mdat box 120 includes all encoded audio and video frames, for example, frames 122, 124, and 126. Moov section 110 is a table of contents for the file and includes a media frame index that references each frame in MP4 file 100 and specifies a frame size and a byte offset for each frame. For example, moov section 110 may include entries 114, 116, and 118, having frame sizes and byte offsets for each encoded frame within MP4 file 100. Moov section 110 is shown as a single table in FIG. 1A, but may be distributed across several structures when encoded in an MP4 file format. Data within mdat box 120 may be unframed. Within mdat box 120, there is no indication where one frame ends and the next begins. The only way to distinguish samples is to use the file information 112 in moov box 110.

The order of the moov and mdat boxes is not defined in general. For different MP4 use cases, the boxes must appear in a specific order. An MP4 player must read the entire moov section 110 before playback can begin. When streaming over HTTP, it is desirable for the player to begin playing before the video has downloaded completely. To support this case, moov box 110 should appear before mdat box 120.

Generating an MP4 file that can be streamed to an MP4 player is usually a two-step process. In the first step, an encoder may generate frames and record their sizes in a separate table. The generated frames may be written to an mdat box in a temporary file or buffer. After all frames have been encoded, the encoder may then write the moov box. In the second step, the encoder may arrange the moov and mdat boxes in a correct order for streaming. One of the problems with this traditional two step MP4 encoding process is that it cannot provide a real-time transcoding, compression, optimization, or any other real-time, on-the-fly modification process.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Exemplary embodiments disclosed herein are directed to methods and systems for budget encoding. Budget encoding is a technique to generate files in a media container format, having a frame index specifying a byte size and a byte offset for each media frame, within a real-time processing model. Although the MP4 container format is used in the exemplary embodiments to illustrate budget encoding, budget encoding may be performed on any other media container format that has a frame index specifying a byte size and a byte offset for each media frame. The real-time budget encoding technique may allow for intercepting one or more downloads from a media server, processing its media content, and generating a media file that can be streamed to a client in a single pass.

Figure 1A:
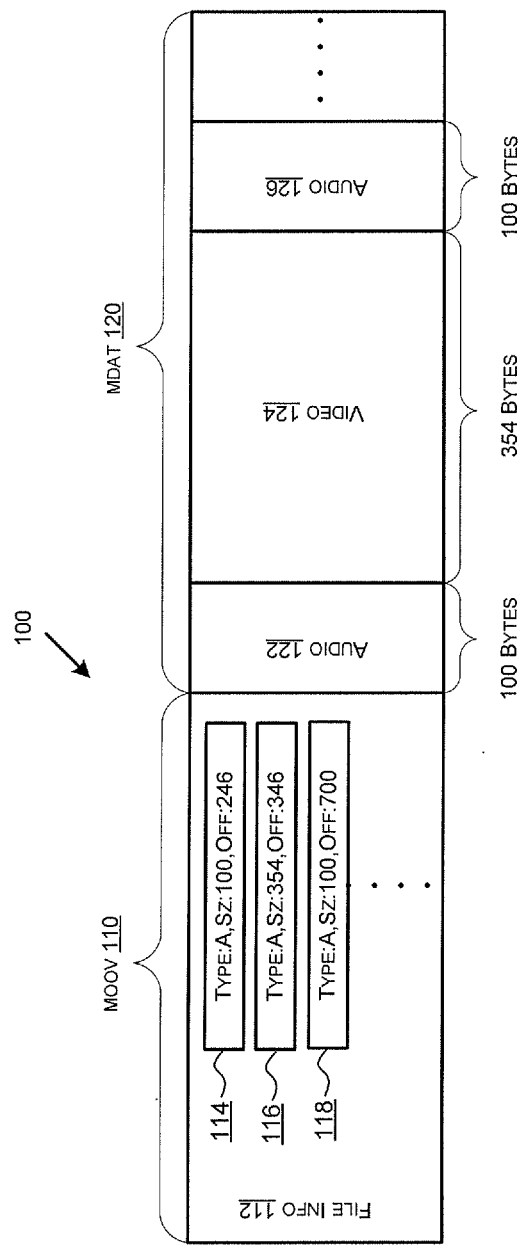
FIG. 1A illustrates an internal layout of an MP4 file.
Figure 1B:
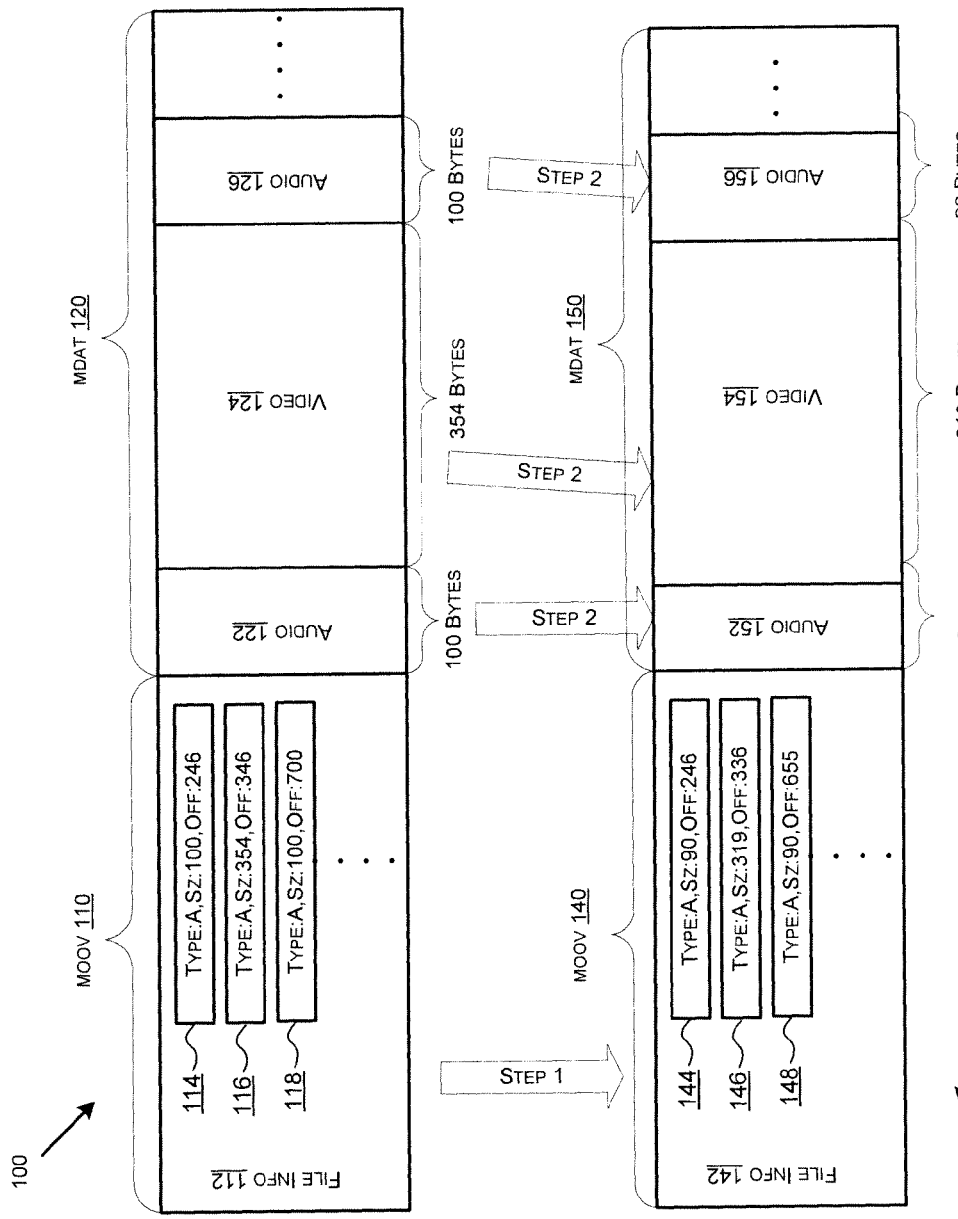
FIG. 1B illustrates an exemplary budget encoding process.

FIG. 1B illustrates an exemplary budget encoding process. Budget encoding is a technique that allows a proxy server to perform real-time, on-the-fly modification process to certain media formats. The modification process may include, for example, transcoding, compression, optimization, and/or any other real-time, on-the-fly modification to media data. For example, in order to optimize an MP4 file on-the-fly and/or in real-time, the proxy server may first compute an output (e.g., optimized) frame index, e.g., moov section, by predicting size of every media frame in output (e.g., optimized) media data. Subsequently, the proxy server may then adhere to its prior predictions by optimizing each new media frame it downloads from a media server to meet the frame size predicted in the output frame index.

More specifically, in a first step, a moov box 110 from an original MP4 file 100 is used to generate an output moov box 140 of an output MP4 file 130. Output moov box 140 may include, but is not limited to, file information 142, which may include entries, such as entries 144, 146, and 148, describing output frame sizes. The output frame sizes in the output moov box 140 are estimated from the original frame sizes from entries 114, 116, and 118 provided in moov box 110 of the original MP4 file 100. The estimated output frame sizes are recorded and can be used as frame budgets in a second step. In the second step, the estimated frame sizes are used as frame budgets when encoding frames. A processing module, e.g., an encoder, uses parameters of a decoded frame and a corresponding frame budget to predict processing parameters, such as encoding parameters, including one or more quantization parameters, to be used for processing (e.g., encoding) the decoded frame. If the processing module predicts wrong and generates a frame that doesn't fit within the corresponding frame budget, it determines new processing parameters and re-processes the frame. Once the frame fits below the budget, it is padded, further described below, to meet the budget and written to an output mdat box 150 of the output MP4 file.

The frame size indicated in output moov box 140 may include both the processed frame and the padding. When an MP4 player plays output MP4 file 140, the processed frame plus padding, for example, media frames 152, 154, and 156, may be sent to a decoder of the MP4 player. The padding sequence may act as a no-operation indicator to the decoder. The exact bit sequence used for padding varies depending on codec.

Total bitrate (file size) for output MP4 file 130 may be fixed once output moov box 140 is written. Each frame may have a fixed size regardless of number of bytes generated by the processing module for each frame.

Figure 2:
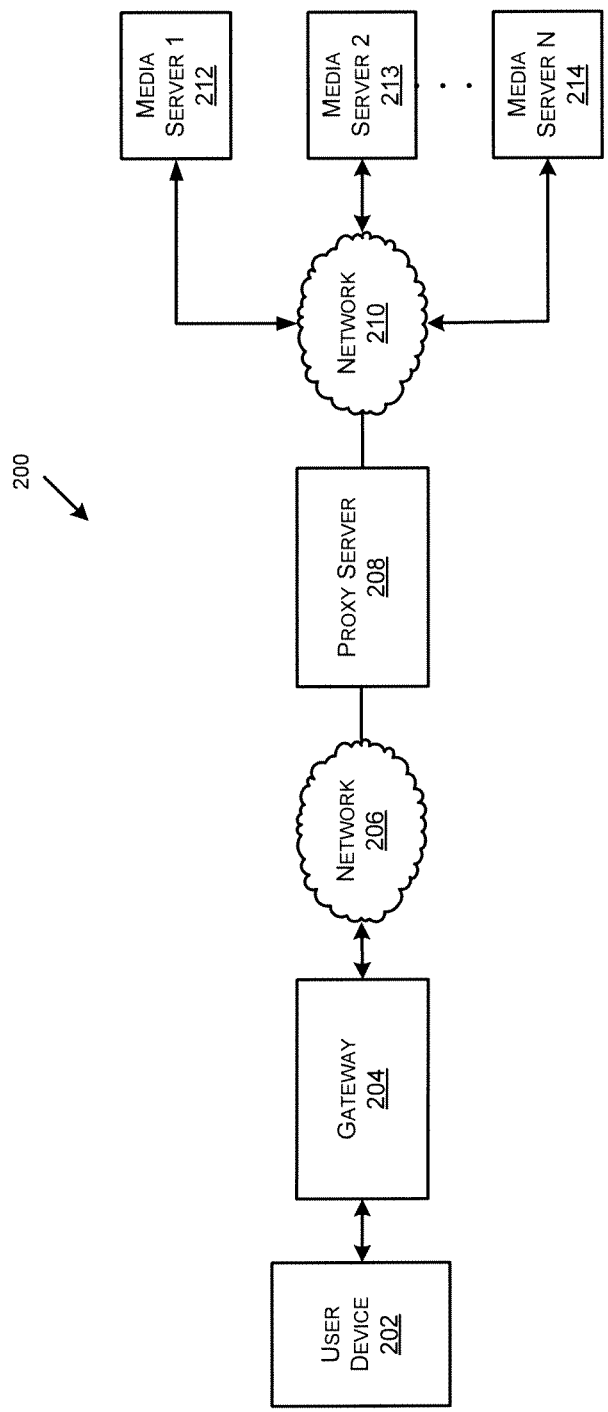
FIG. 2 illustrates a block diagram of an exemplary system.

FIG. 2 illustrates a block diagram of an exemplary system 200. Exemplary system 200 may be any type of system that provides media content over a local connection or a network, such as a wireless network, Internet, broadcast network, etc. Exemplary system 200 may include, among other things, a user device 202, a gateway 204, one or more networks 206 and 210, a proxy server 208, and one or more media servers 212-214.

User devices 202 can be a hardware device such as a computer, a PDA, a cell phone, a laptop, a desktop, or any device accessing a data network. User device 202 can include software applications that allow the device to communicate with and receive data packets, such as data packets of streaming media, from a data network. For example, user device 202 may send request data to a media server to download a particular streaming media file, and the media server can transmit the streaming media file to user device 202. In some embodiments, the streaming media file may be routed through proxy server 208. User device 202 may provide a display and one or more software applications, such as a media player, for displaying streaming media to a user of the user device.

Gateway 204 is one or more devices that serves as an entrance or a means of access and may or may not convert formatted data provided in one type of network to a particular format required for another type of network. Gateway 204, for example, may be a server, a router, a firewall server, a host, or a proxy server. For example, gateway 204 may have the ability to transform signals received from user device 202 into signals that network 206 or 210 can understand and vice versa. This transforming ability, however, is not required in some data network, for example, Fourth-Generation (4G) or Worldwide Interoperability for Microwave Access (WiMAX). Gateway 204 may be capable of processing audio, video, and T.120 transmissions alone or in any combination, and is capable of full duplex media translations. Further, gateway 204 can include proxy server 208 for budget encoding.

Networks 206 and 210 may include any combination of wide area networks (WANs), local area networks (LANs), or wireless networks suitable for packet-type communications, such as Internet communications, or broadcast networks suitable for distributing media content.

Proxy server 208 can be implemented as a software program and/or hardware device that provides budget encoding. Proxy server 208 is a server that provides communication between user device 202 and media servers 212-214. For example, proxy server 208 could include Bytemobile's Web Fidelity Service. Proxy server 208 may perform real-time, on-the-fly modification to certain media formats. The modification process may include, for example, transcoding, compressing, optimizing, and/or any other real-time, on-the-fly modifying to media data.

For example, proxy server 208 may apply budget encoding techniques to an original MP4 file. In budget encoding techniques, the original MP4 file may be coded to a lower bitrate without substantially changing the media formats. A higher compression may be used during the processing. The processing may fit given media into a smaller storage space or compress the amount of information such that it is transmitted over a lower bandwidth channel. Budget encoding technique may also be used to transcode video content, add watermarks, logos, or other similar video processing on-the-fly, as original video content is downloaded from the server. As an alternative to the configuration of system 200 shown in FIG. 2, the processing performed by proxy server 208 can be performed by any of the media servers 212-214, or any network device between user device 202 and media servers 212-214.

Proxy server 208 may include a budget video processor ("BVP") to perform the budget techniques. The BVP may receive an original MP4 file, estimate output frame sizes as frame budgets, generate an output moov box, and decode media frames in the original MP4 file. The BVP can then predict process parameters (e.g., encoding parameters) to process (e.g., encode) the decoded media frames such that the processed frames fit within the frame budgets. The BVP may also pad the processed frames to meet the frame budgets, and write the padded frames to an output mdat box. The BVP may provide an output MP4 file to user device 202.

In addition, proxy server 208 may support media seeking, i.e., fast forwarding or rewinding to a random location in media data, in context of budget encoding or any other such real-time, on-the-fly processing. For example, proxy server 208 may support the media seeking for MP4 media data or any other media format that requires access to a complete media frame index.

Media servers 212-214 can be computer servers that receive a request for media content from user device 202, process the request, and provide media content to user device 202 through, in some embodiments, proxy server 208. For example, media servers 212-214 can be web servers, enterprise servers, or any other type of computer servers. Media servers 212-214 can be computers programmed to accept requests (e.g., HTTP, RTSP, or other protocols that can initiate a media session) from user device 202 and to serve user device 202 with streaming media. Also, media servers 212-214 can be PDAs, cell phones, laptops, desktops, or any devices configured to transfer media content to user device 202 through, in some embodiments, one or more networks 206 and 210. Further, media servers 212-214 can be broadcasting facilities, such as free-to-air, cable, satellite, and other broadcasting facilities, for distributing media content to user device 202 through, in some embodiments, proxy server 208. In some embodiments, proxy server 208 may be part of any media servers 212-214.

Figure 3:
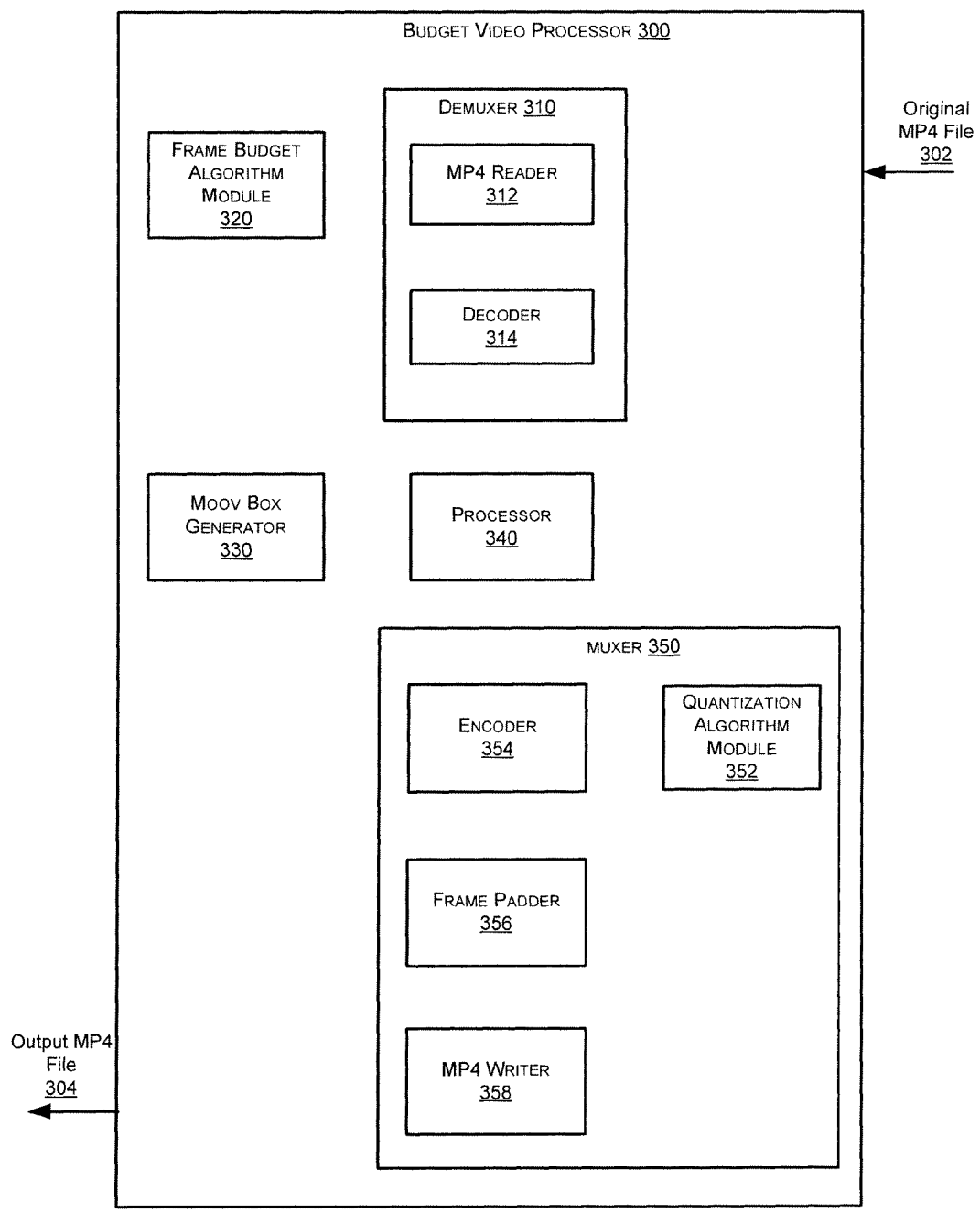
FIG. 3 is a block diagram illustrating an embodiment of an exemplary proxy server's budget video processor in the exemplary system of FIG. 2.

FIG. 3 is a block diagram illustrating an embodiment of an exemplary budget video processor ("BVP") of proxy server 208 in the exemplary system of FIG. 2. For simplicity, FIG. 3 only illustrates a BVP 300, an original MP4 file as an input (302), and an output MP4 file as an output (304). BVP 300 may include a demuxer 310, a frame budget algorithm module 320, a moov box generator 330, a processor 340, and a muxer 350. The illustrated configuration of BVP 300 is exemplary only, and can be modified to provide discrete elements or combine multiple elements into a single one, and be provided as any combination of hardware and software.

With reference to FIG. 3, demuxer 310 can include a MP4 reader 312 and a decoder 314. MP4 reader 312 can be a software program and/or a hardware device that can receive an original MP4 file and extract from the original MP4 file a frame index, e.g., an original moov box, specifying a frame/byte size, a byte offset, and order of each original frame in an original mdat box of the original MP4 file. Further, MP4 reader 312 may retrieve original media frames from the original mdat box for further processing.

Decoder 314 can be provided as a software program and/or a hardware device to decode each retrieved media frame, obtain original encoding parameters, and annotate the original encoding parameters onto the decoded frame. The original encoding parameters include, but are not limited to, one or more original quantization parameters for quantizing (lossy-compressing) the retrieved media frame, original configuration information of an encoder, one or more original compression algorithms and parameters, and other original encoding information used for creating the retrieved media frame. Decoder 314 may supply the original encoding parameters to quantization algorithm module 352 to predict new encoding parameters, including new quantization parameters, for generating an encoded frame within a frame budget. Decoder 314 may support commonly used audio/video encoding standards, for example, H.264 and/or MPEG4 codecs.

Frame budget algorithm module 320 can be provided as a software program and/or a hardware device to calculate byte size for each output frame in the output MP4 file (304) based on the original moov box. The calculated byte size can be used as a frame budget for an output media frame such that a corresponding original media frame can be compressed to fit within the frame budget. Each output frame has a corresponding frame budget. The primary input to frame budget algorithm module 320 can be the original moov box from the original input MP4 file (302). Frame budget algorithm module 320 may also consider some parameters determined by decoder 314 and/or encoder 354. These parameters may be determined during an initial probe of the input file, and may be available for a sample of the frames in the input.

Frame budget algorithm module 320 may consider whether the output MP4 file is sent to the client using an additional lossless compression technique, for example, gzip content encoding or other compression techniques. Some or most padding added to an output frame may be eliminated through the additional compression technique. Thus, frame budget algorithm module 320 may increase the frame budgets to reduce the chance that any frame may need to be encoded more than once to fit within a corresponding frame budget. More bytes may be wasted in each frame, but the compression may eliminate these extra bytes, so they may not be transmitted over the network.

Moov box generator 330 can be provided as a software program and/or a hardware device that combines the frame budgets determined by frame budget algorithm module 320 with the original moov box extracted from the original MP4 file to generate an output/processed moov box for the output MP4 file. Moov box generator 330 may also consider the configuration of encoder 354 to update certain fields in the output moov box.

Processor 340 can be provided as a software program and/or a hardware device that functions as a placeholder for the media data being processed. Processor 340 may also perform additional modifications to the media data, for example, such as adding a watermark to the media data.

Muxer 350 can include a quantization algorithm module 352, an encoder 354, a frame padder 356, and an MP4 writer 358. The illustrated configuration of Muxer 350 is exemplary only, and can be modified to provide discrete elements or combine multiple elements into a single one, and be provided as any combination of hardware and software.

Quantization algorithm module 352 can be provided as a software program and/or a hardware device that determines new encoding parameters based on the frame budgets decided by frame budget algorithm module 320 and the encoding parameters annotated by decoder 314 for decoded media frames. The new encoding parameters may include, but are not limited to, one or more quantization parameters for quantizing the retrieved media frame, configuration information of encoder 354, compression algorithms and parameters, and other new encoding information for encoding the decoded media frames.

After frame budget algorithm module 320 has determined a frame budget for an output frame, encoder 354 may reliably encode each original media frame to most closely meet the frame budget without exceeding the allotted bytes. Many methods may be used to achieve byte reduction in media processing. In the exemplary embodiments discussed herein, one or more encoding parameters, including quantization parameters, may be used to control byte reduction on a frame-by-frame basis.

Quantization algorithm module 352 may produce one or more new quantization (Q) parameters that may result in an encoded frame below a corresponding frame budget. Encoder 354 may then encode the frame with the one or more new quantization parameters. If the resulting frame does not meet the budget, quantization algorithm module 352 will further adjust the one or more new quantization parameters and re-encode until the frame fits within the allocated budget. Once the frame is within the allocated budget, it may be padded to match the budget before being written to the client.

Quantization algorithm module 352 may also consider types of media frames to generate the quantization parameters, for example, such as I-frames or P-frames. I-frames may be the least compressible but may not require other media frames to decode. P-frames may use data from previous I-frames to decompress and may be more compressible than I-frames. Although an original moov box may not explicitly designate which frames are I-frames or P-frames, it may be possible to estimate a group of picture ("GOP") size (number of frames between I-frames) since I-frames are typically larger than P-frames. For frames with a fixed GOP size, this may lead to periodicity in the original moov box. This GOP induced periodicity may be measured by calculating maximum of a simple autocorrelation function of media frame sizes. This calculation is a refinement used to obtain better performance (i.e. less padding). Knowing this GOP size in advance may aid in selecting the output encoding parameters, e.g., GOP, to match encoding parameters of an input media frame.

Encoder 354 can be provided as a software program and/or a hardware device that encodes each decoded media frame to meet a corresponding frame budget without exceeding the allotted bytes. Encoder 354 may take two inputs, i.e., an output of frame budget algorithm module 320 and an output of quantization algorithm module 352. If encoding parameters predicted by quantization algorithm module 352 do not produce a frame that fits within a corresponding frame budget, encoder 354 may invoke quantization algorithm module 352 to adjust the parameters, then re-encode the frame. A feedback loop may exist between encoder 354 and quantization algorithm module 352 to refine encoding parameters when encoder 354 exceeds a frame budget and has to re-encode a frame. Refining encoding parameters will be further discussed below in detail. Budget encoding may require encoder 354 support for commonly used audio/video encoding standards, for example, H.264 and/or MPEG4 codecs.

For a given frame budget, there may be many encoder configurations and/or quantization parameters that can generate a frame at or under the budget. Because the frame budget is fixed, it is beneficial to pick encoder configurations and/or quantization parameters that minimize an amount of padding. One or more concepts can be used to measure this. One such concept is file utilization. The formula for the file utilization is shown as:

$$\text{File Utilization} = 1 - \frac{\text{Padding Bytes}}{\text{File Size}}$$

File utilization may provide how much of the file is used to convey useful frame data versus padding.

If encoder 354 does not meet the budget on a first attempt, it may need to re-encode the frame with different encoding parameters until the frame meets the budget. This process can introduce a new overhead when compared to the traditional encoder process. The processing overhead may be measured by computing an average number of encodes per output frame:

$$\text{Overhead}_1 = \frac{\text{Number of encoder iterations}}{\text{Number of output frames}}$$

Also, processing overhead for two files with different output frame rates may be compared by computing an average number of encodes per output media second:

$$\text{Overhead}_2 = \frac{\text{Number of encoder iterations}}{\text{Output file duration}}$$

The above equations may be used to measure the merit of different frame budget and quantization prediction algorithms, and help predict an optimal frame budget and optimal encoding parameters.

Frame padder 356 can be provided as a software program and/or a hardware device that inserts padding bytes to make an encoded frame match a corresponding frame budget. The padding bytes may ultimately be fed to a decoder on user device 202, and these padding bytes are a no-operation indication to the decoder.

MP4 writer 358 can be provided as a software program and/or a hardware device to generate a final output MP4 file and/or stream the MP4 file to user device 202. During a setup phase, MP4 writer 358 may write to the output MP4 file the output moov box generated by moov box generator 330. During processing, MP4 writer 358 may write encoded frames in the exact order prescribed by the output moov box.

In some embodiments, proxy server 208 may combine budget encoding with standard file compression. The padding sequence inserted by budget encoding is highly redundant, so the output MP4 file resulting from budget encoding may be compressed by a traditional file compression method, as described previously therein. This may reduce the total number of bytes sent across the network with little additional processing overhead. With an appropriate compression method, the padding bytes may be virtually eliminated from the MP4 file as it is transmitted across a data network. Such combination of a traditional file compression technique with budget encoding may be used to reduce the processing overhead incurred with budget encoding. In some embodiments, if it is known that a compression technique will be used on the output MP4 file, frame budget algorithm module 320 may pick a frame size, a frame budget, large enough so that encoder 354 may rarely have to re-encode a frame. The resulting uncompressed MP4 file may actually be larger than the original one. Compression may eliminate all padding, so the number of bytes transmitted across the network may be almost the same as number of bytes actually used for the encoded frames. Effectively, budget encoding could use the compression techniques described in U.S. Provisional Patent Application No. 61/165,224 "A FRAMEWORK FOR QUALITY-AWARE VIDEO OPTIMIZATION," filed on Mar. 31, 2009.

Figure 4:
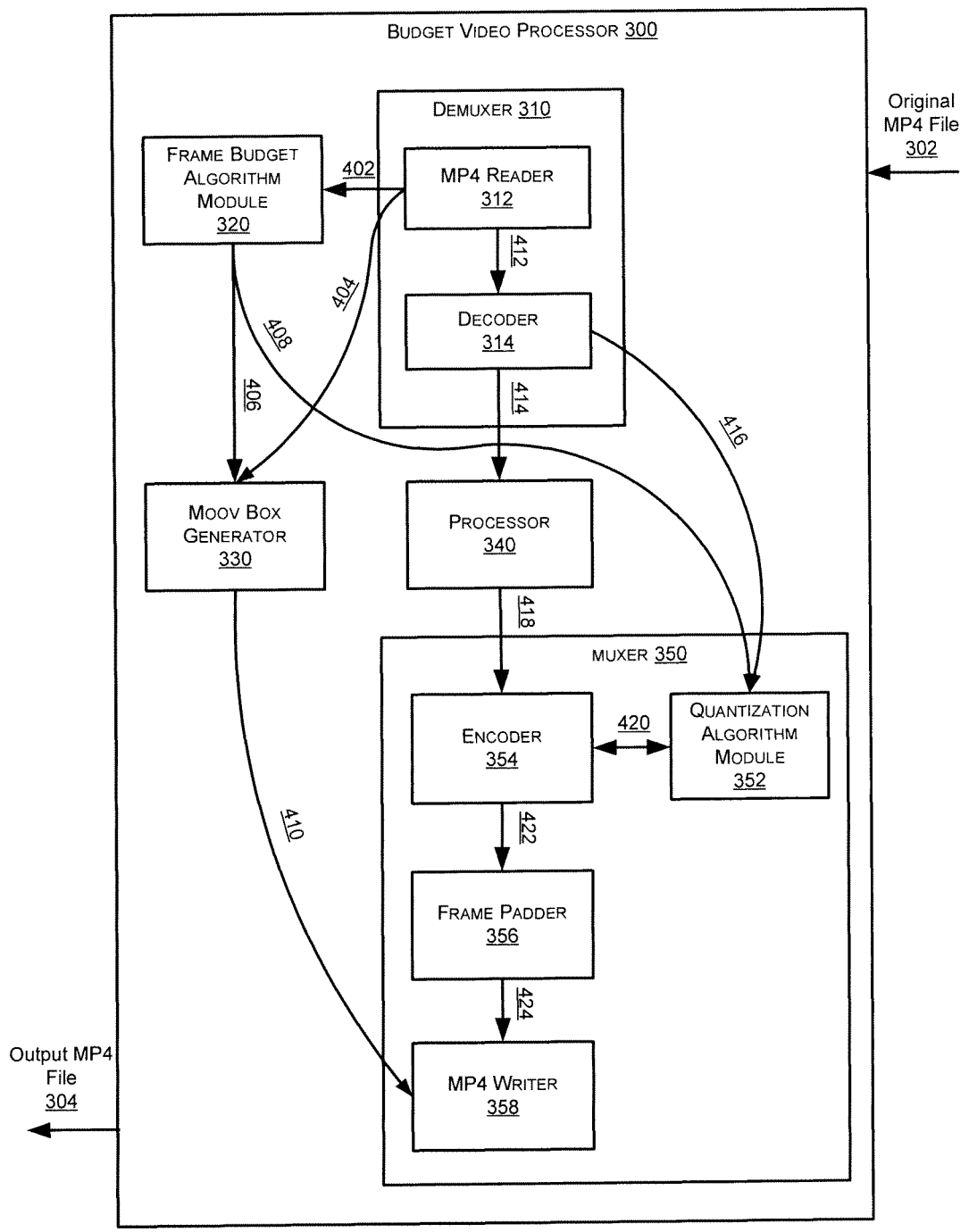
FIG. 4 is a functional diagram illustrating an exemplary process flow in the embodiment of FIG. 3.

FIG. 4 is a functional diagram illustrating an exemplary process flow in the embodiment of FIG. 3. Without departing from the exemplary embodiments, the exemplary process flow can be altered to delete steps, change the order of steps, or include additional steps.

After receiving (302) an original MP4 file from a data network, BVP 300 can direct the MP4 file to MP4 reader 312. MP4 reader 312 may extract from the original MP4 file a frame index, e.g., an original moov box, referencing each original frame, and parse the original moov box to retrieve information about the original media frames, for example, the frame size, the offset, and the order of each original frame in an original mdat box. MP4 reader 312 may pass (402, 404) the extracted original moov box and the parsed information to frame budget algorithm module 320 and moov box generator 330. In some embodiments, frame budget algorithm module 320 and moov box generator 330 may parse the frame index, e.g., the original moov box, to retrieve the information about the original media frames.

Based on the original moov box and the frame index of the original media frames, frame budget algorithm module 320 may estimate frame budgets, i.e., frame sizes, for processed/encoded frames without padding. When estimating the frame budgets, frame budget algorithm module 320 may also consider some parameters determined by decoder 314 and/or encoder 354. If a compression technique is to be used and padding may be removed, frame budget algorithm module 320 may produce larger frame budgets to reduce a chance of encoding a frame more than once to fit within a corresponding frame budget. Frame budget algorithm module 320 may provide (406, 408) the estimated frame budgets to moov box generator 330 and quantization algorithm module 352, respectively.

After receiving (404, 406) the original moov box and the estimated frame budgets, moov box generator 330 may generate an output frame index, e.g., an output moov box, for an output MP4 file 304. In some embodiments, moov box generator 330 may also consider configuration of encoder 354 to update certain fields in the output moov box. The output moov box may contain byte size and byte offset for each output frame within the output MP4 file. Information in the output moov box may correspond to information in the original moov box. The order of each output frame within the output MP4 file may remain the same as that in the original MP4 file. Moov box generator 330 may transfer (410) the output moov box to MP4 writer 358 to write the output moov box to the output MP4 file to be streamed to user device 202.

Besides extracting the original moov box, MP4 reader 312 may also retrieve original media frames from an original mdat box of the original MP4 file for further processing. MP4 reader 312 can retrieve an original media frame, one by one, based on the frame index, e.g., the original moov box, referencing each original frame. MP4 reader 312 may pass (412) the retrieved original frame to decoder 314.

Decoder 314 may decode the original frame, extract original encoding parameters from the decoded frame, and annotate the encoding parameters onto the decoded frame for use by later components. Decoder 314 may pass (414) the decoded frame to processor 340 for further processing. In addition, decoder 314 may provide (416) the original encoding parameters to quantization algorithm module 352 to predict new encoding parameters for generating an encoded frame within a corresponding frame budget.

Processor 340 can perform additional generic processing to the media data. Processor 340 may transfer (418) the processed frame to encoder 354.

Encoder 354 may perform encoding on processed frame based on its communications with quantization algorithm module 352. Quantization algorithm module 352 may set new encoding parameters, including new quantization parameters, for encoding the current processed frame. The setting new encoding parameters may be based on a corresponding frame budget decided by frame budget algorithm module 320 and the original encoding parameters provided by decoder 314. The new encoding parameters can be used to generate an encoded frame fitting within the frame budget. Quantization algorithm module 352 may provide (420) the new encoding parameters to encoder 354.

By taking (420) the new encoding parameters as inputs, encoder 354 may encode the current processed frame to generate an output frame fitting within the corresponding frame budget. If the generated frame does not fit within the corresponding frame budget, encoder 354 may invoke (420) quantization algorithm module 352 to adjust the encoding parameters, including new quantization parameters, then re-encode the frame. Encoder 354 may provide (422) the encoded frame to frame padder 356 for padding.

The encoded frame may be smaller than the corresponding frame budget. Frame padder 356 may insert padding to make the encoded frame match the corresponding frame budget. In some embodiments, the padding may be eliminated if a compression technique is used before transmitting the padded frame. Frame padder 356 may provide (424) the padded frame to MP4 writer 358.

After receiving (410) the output moov box, MP4 writer 358 may write the output moov box to an output MP4 file as a first step. Also, after receiving (424) the padded frame, MP4 writer 358 may write the padded frame in the exact order prescribed by the output moov box. After the MP4 writer 358 performs any processing, the output MP4 file may be provided or streamed (304) to user device 202.

Figure 5:
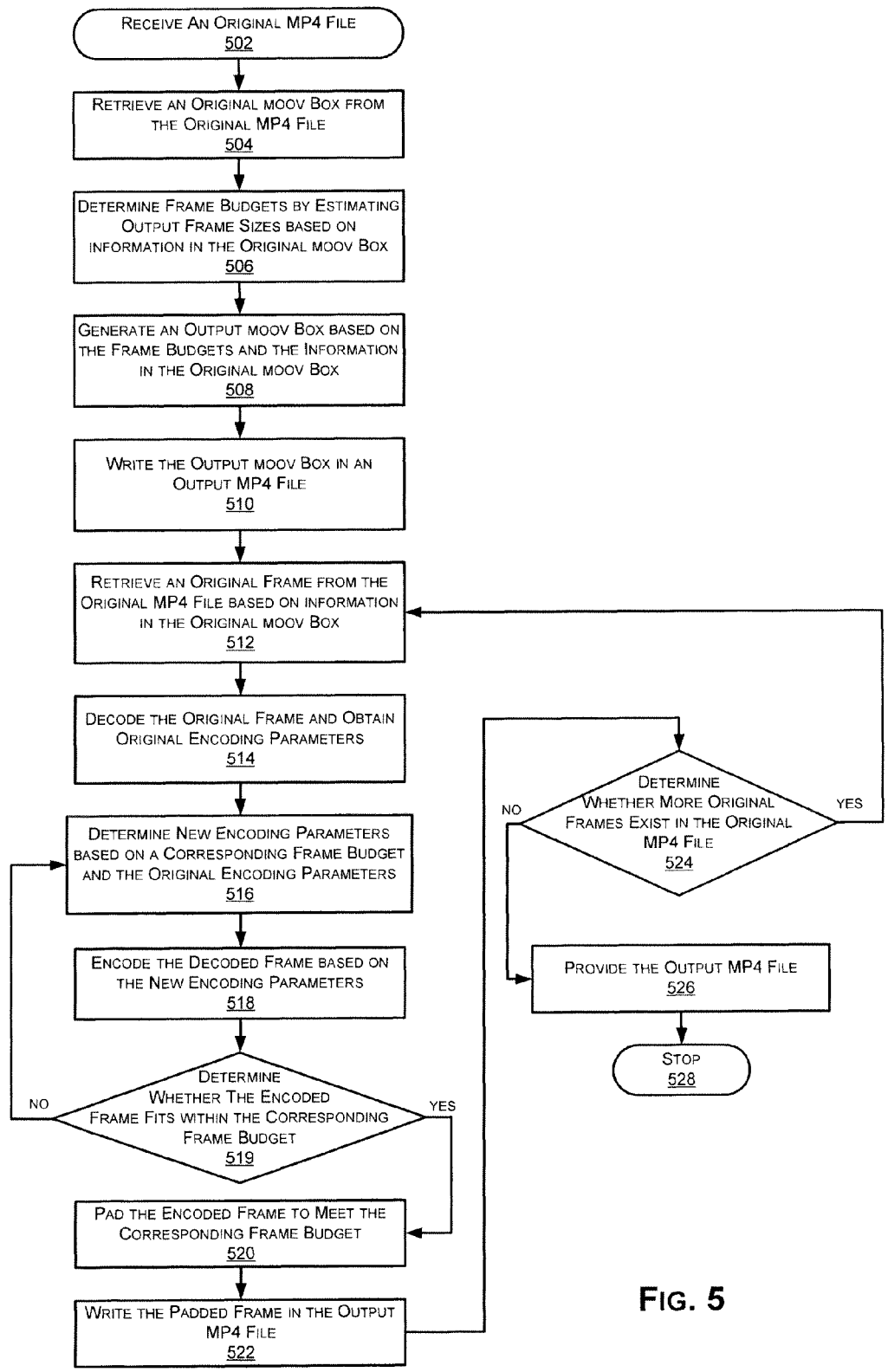
FIG. 5 is a flowchart representing an exemplary method of budget encoding.

FIG. 5 is a flowchart representing an exemplary method of budget encoding. Without departing from the exemplary embodiments, the exemplary process flow can be altered to delete steps, change the order of steps, or include additional steps.

After receiving (502) an original MP4 file, a budget video processor ("BVP") retrieves (504) from the file a frame index, e.g., an original moov box. The frame index may reference each original frame and specify information about original frames in the original MP4 file, such as frame size and byte offset of each original frame.

Based on the frame index, the BVP determines (506) frame budgets by estimating output frame sizes. Each output frame has one corresponding frame budget. The BVP generates (508) an output frame index, e.g., an output moov box, based on the frame budgets and the frame index referencing original frames. The BVP uses the frame budgets as frame sizes of output frames in the output frame index, and computes byte offset for each output frame based on the frame sizes. Then, the BVP writes (510) the output frame index, e.g., output moov box, in an output MP4 file.

The BVP retrieves (512) an original frame from the original MP4 file based on the frame index of original frames in the original MP4 file. Also, the BVP decodes (514) the original frame and obtains (514) original encoding parameters of the decoded frame.

Based on a corresponding frame budget and the original encoding parameters, the BVP determines (516) new encoding parameters, including quantization parameters, for the decoded frame. Using the new encoding parameters, the BVP encodes (518) the decoded frame. The BVP determines (519) whether the encoded frame fits within the corresponding frame budget. If the encoded frame cannot fit within the corresponding frame budget, the BVP may go back to step 516 to adjust (516) the new encoding parameters and re-encode (518) the frame using the adjusted encoding parameters until the encoded frame fits within the corresponding frame budget.

If the encoded frame fits within the corresponding frame budget, the BVP can pad (520) the encoded frame to meet the corresponding frame budget if the encoded frame does not meet the frame budget. The padding adds extra no-operation bytes to the encoded frame. The extra no-operation bytes may be eliminated by a compression technique used before transmission, or is ignored by a decoder on a user device.

The BVP writes (522) the padded frame in the output MP4 file to be streamed to the user device. In some embodiments, the BVP may stream the output frame index, e.g, the output moov box, and media frames to the user device as they are generated.

Further, the BVP determines (524) whether more original frames exist in the original MP4 file. If yes, the flow goes back to step 512. If not, the BVP provides (526) or streams the output MP4 file to the user device. The method then ends (528).

Figure 6:
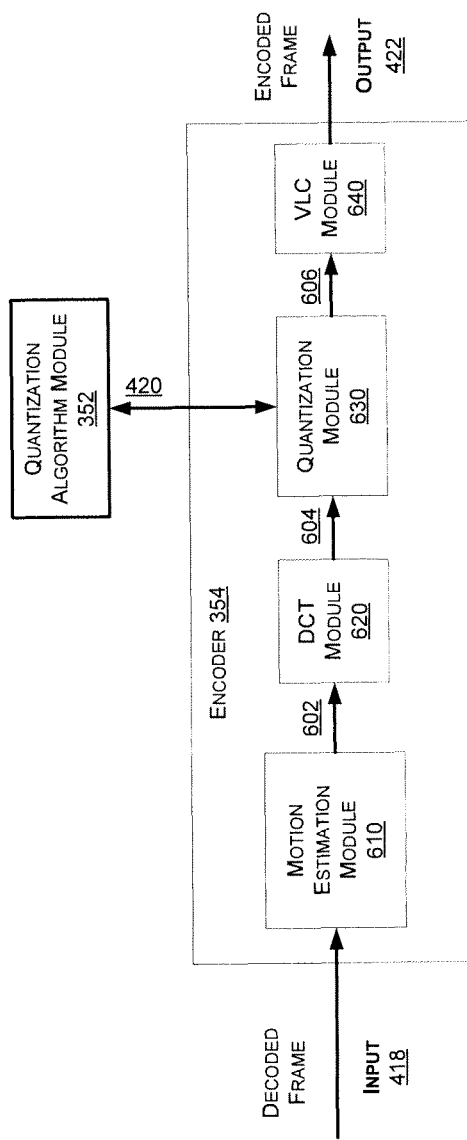
FIG. 6 is a block diagram with an exemplary process flow illustrating an embodiment of an exemplary encoder of the exemplary budget video processor of FIG. 3.

FIG. 6 is a block diagram with an exemplary process flow illustrating an embodiment of an exemplary (simplified) encoder 354 of the exemplary BVP of FIG. 3. The illustrated configuration of encoder 354 is exemplary only, and can be modified to provide discrete elements or combine multiple elements into a single one, and be provided as any combination of hardware and software. Without departing from the exemplary embodiments, the exemplary process flow can be altered to delete steps, change the order of steps, or include additional steps.

FIG. 6 provides a description of a generic video encoder to illustrate how the Quantization Algorithm module may be used in the encoding process. With reference to FIG. 6, encoder 354 can include a motion estimation module 610, a DCT module 620, a quantization module 630, and a VLC module 640. Motion estimation module 610 can be provided as a software program and/or a hardware device to determine motion vectors that describe transformation from one 2D image to another and from adjacent frames in a video sequence. Motion estimation module 610 may use pixelbased methods, feature-based methods, and/or other methods to find motion vectors. After receiving (418) a decoded media frame as an input, motion estimation module 610 may find motion vectors, and pass (602) the result to DCT module 620.

DCT module 620 can be provided as a software program and/or a hardware device to perform lossy data compression on media frames processed by DCT module 620. Based on the result provided (602) by motion estimation module 610, DCT module 620 may employ a discrete cosine transform ("DCT") method to convert audio and/or image signals presented in the decoded frame into elementary frequency components. DCTs can be used in lossy data compression of audio and images. DCT module 620 may use the DCTs to express a sequence of finitely many data points, for example, waveforms or pixels, in terms of a weighted sum of cosine functions oscillating at different frequencies, where small high-frequency components can be discarded. DCT module 620 may provide (604) the result to quantization module 630 for further processing.

Quantization module 630 can be provided as a software program and/or a hardware device to quantize the frequency components generated by DCT module 620. The quantization process, a lossy data compression technique, involves compressing a range of values to a single quantum value. By reducing the number of discrete symbols in the media frame, the frame becomes more compressible. As discussed previously, quantization algorithm module 352 may generate one or more new quantization parameters based on a corresponding frame budget, original encoding parameters, and/or other information. By applying the new one or more quantization parameters to the quantization process, quantization module 630 may compress the frame to fit within the corresponding frame budget after being encoded. If the encoded frame cannot fit within the corresponding frame budget, quantization module 630 may invoke quantization algorithm module 352 to adjust the new quantization parameters. Quantization module 630 may provide (606) the quantized frame to VLC module 640 for coding.

VLC module 640 can be provided as a software program and/or a hardware device that employs variable-length coding ("VLC") to map audio and/or video source symbols presented in the quantized frame to a variable number of bits. VLC, a lossless data compression technique, may allow audio and/or video sources to be compressed and decompressed with zero error. VLC module 640 provides (422) the encoded frame for further processing.

Figure 7:
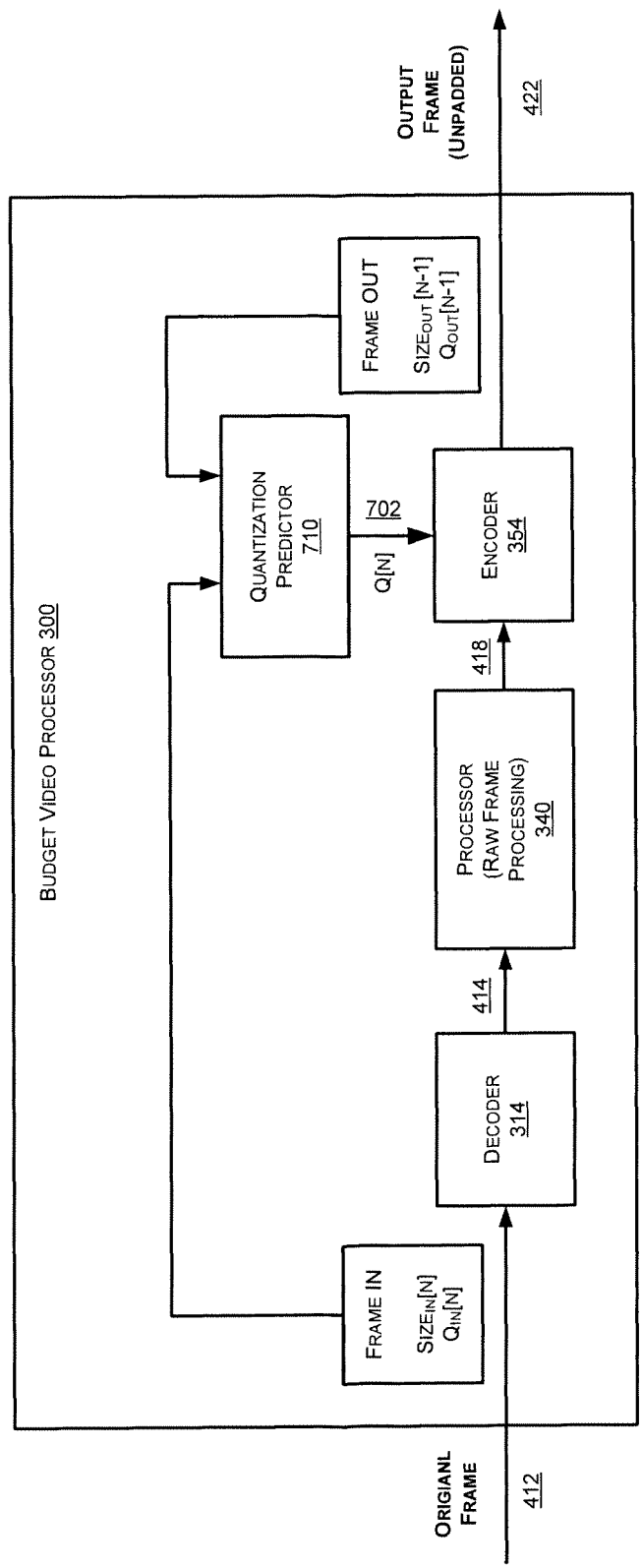
FIG. 7 is a block diagram with an exemplary process flow illustrating another embodiment of the exemplary budget video processor of FIG. 3 and FIG. 4.

FIG. 7 is a block diagram with an exemplary process flow illustrating another embodiment of the exemplary (simplified) BVP 300 of FIGS. 3 & 4. The same components and steps of FIGS. 3 & 4 were discussed previously and are not discussed herein. The illustrated configuration of simplified BVP 300 is exemplary only, and can be modified to provide discrete elements or combine multiple elements into a single one, and be provided as any combination of hardware and software. Without departing from the exemplary embodiments, the exemplary process flow can be altered to delete steps, change the order of steps, or include additional steps.

A requirement for encoder 354 may be that a frame size, $Size_{OUT}[n]$, for an encoded frame is less than or equal to a corresponding budget for an input (original or raw) frame n, $Size_{Budget}[n]$. Encoder 354 may use a quantization parameter $Q[n]$ initially, and may only re-encode a frame with a higher quantization parameter if the initial output frame is larger than the corresponding budget $Size_{Budget}[n]$. The final size of an encoded media frame is not known until quantization and VLC steps are completed by encoder 354. For this reason, relationship between Q and frame size for a given frame may not be known up-front, and may only be predicted.

A quantization predictor 710 may be utilized to predict quantization parameters, and continuously characterize parameters of both an input media frame 412 and an output media frame 422. Quantization predictor 710 can be provided as a software program and/or a hardware device, and can be part of quantization algorithm module 352, or a different component of BVP 300. Quantization predictor 710 may be updated by information includes, but not limited to:

$Size_{IN}[n]$: Frame size of current input media frame in an original MP4 file. This information may be retrieved from an original moov box of the original MP4 file.

$Q_{IN}[n]$: One or more old quantization parameters used for current input media frame. This information may be provided by BVP 300 before the current input media frame is processed.

$Size_{OUT}[n-1]$: Frame size of previously encoded media frame. This information may be stored in and retrieved from memory or other storage device.

$Q_{OUT}[n-1]$: One or more quantization parameters used for previously encoded media frame. This information may be stored in and retrieved from memory or other storage device.

After its state is updated with the above information, quantization predictor 710 may predict one or more quantization parameters Q[n] to most closely meet the corresponding budget $Size_{Budget}[n]$, and provide (702) the quantization parameters to encoder 354. This may be an important step in encoding process and may have several implications. If Q is too small, it may result in a frame size that is over budget. If so, encoder 354 may need to re-encode the over budget frame at a higher quantization until the budget is reached. If Q is too large, it may result in an unnecessarily low-quality media frame, and subsequently result in a large amount of padding. Quantization predictor 710 may predict an optimal quantization parameter for a frame to minimize or avoid these problems.

Figure 8:
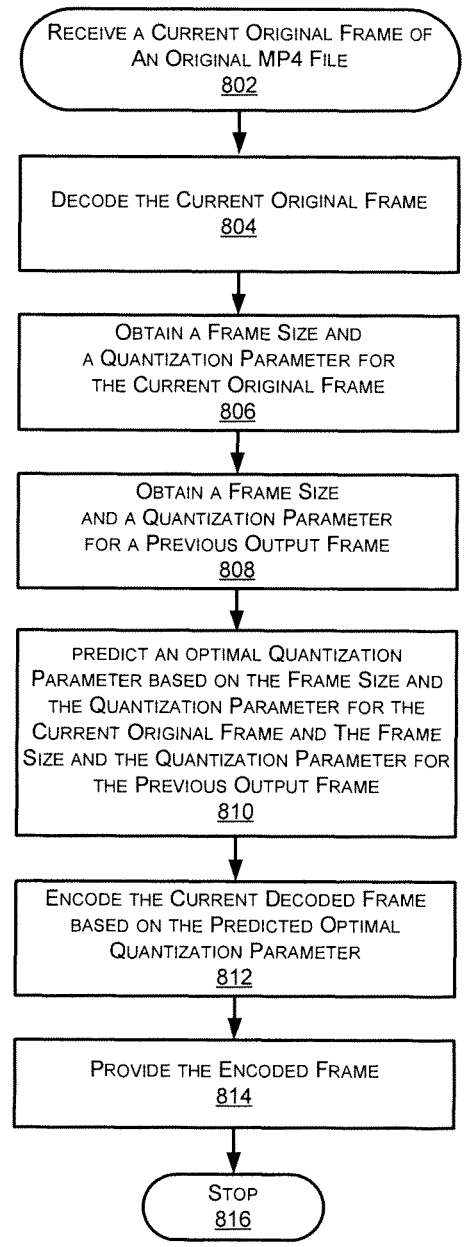
FIG. 8 is a flowchart representing an exemplary method for predicting quantization parameters.

FIG. 8 is a flowchart representing an exemplary method of predicting quantization parameters. Without departing from the exemplary embodiments, the exemplary process flow can be altered to delete steps, change the order of steps, or include additional steps.

After receiving (802) a current original frame within an original MP4 file, a BVP decodes (804) the frame, and provides original encoding parameters for the frame. The BVP obtains (804) a frame size and a quantization parameter for the current original frame, as discussed previously therein. Also, the BVP obtains (806) a frame size and a quantization parameter for a previously output frame, which may be stored in a memory or other storage device.

After obtaining the information from the previously output frame, the BVP predicts (810) an optimal quantization parameter based on the frame sizes and the quantization parameters for the current original frame and the previously output frame. By employing the predicted optimal quantization parameter, the BVP encodes (812) the decoded frame to fit within a corresponding frame budget, and provides (814) for padding. The method then ends (816).

Figure 9:
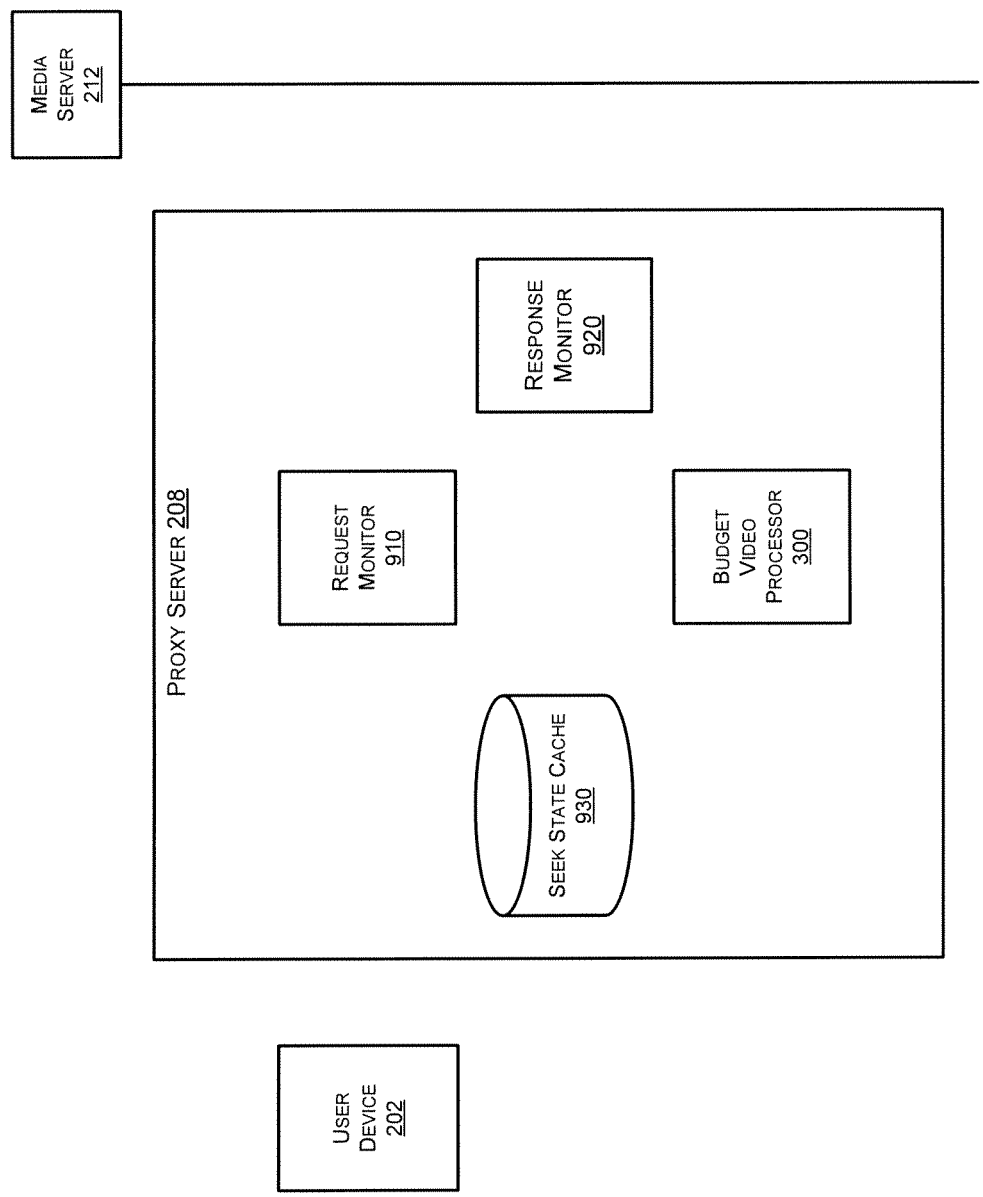
FIG. 9 is a block diagram illustrating an exemplary embodiment of the exemplary system of FIG. 2.

FIG. 9 is a block diagram illustrating an exemplary embodiment of the exemplary system of FIG. 2. For simplicity, FIG. 9 only illustrates a user device 202, a proxy server 208, and a media server 212. In some embodiments, proxy server 208 may include, among other things, a request monitor 910, a response monitor 920, BVP 300, and a seek state cache 930. The illustrated configuration of proxy server 208 is exemplary only, and can be modified to provide discrete elements or combine multiple elements into a single one, and be provided as any combination of hardware and software.

Proxy server 208 may support media seeking, i.e., fast forwarding or rewinding to a random location in the media data, in context of budget encoding or any other such on-the-fly optimization technique. Proxy server 208 may support the media seeking for MP4 streaming media data or any other media format that requires access to a complete media frame index.

Request monitor 910 can be a software program and/or a hardware device that receives or intercepts a request for media data, such as an HTTP request for a specific URL, from user device 202. Request monitor 210 has the ability to forward a request for original media data to media server 212, translate a seek request for optimized media data into a new seek request for the original media data, and forward the new seek request to media server 212.

Response monitor 920 can be a software program or a hardware device that receives media data from media server 212. After receiving the media data, in some embodiments, response monitor 920 provides the media data to BVP 300 for optimization. If the received media data corresponds to a seek request with a byte range for optimized media data, response monitor 920 may confirm that media server 212 responds with requested portion of the media data, and then provide the media to BVP 300 for optimization.

BVP 300 may perform optimization on the received media data by employing, for example, budget encoding as described previously therein, and provide the optimized media data to user device 202. BVP 300 can be located within, local to, or remote from proxy server 208.

Seek state cache 930 can be a structured collection of records or data of state information, associated with optimization of streaming media data, for performing a media seek. The database structure can be organized as a set of queues, a structured file, a relational database, an object-oriented database, or any other appropriate database. Computer software, such as a database management system, may be utilized to manage and provide access to seek state cache 930. Seek state cache 930 may store and provide original media data's frame index, for example, an original MP4 file's moov box. Also, seek state cache 930 may store and provide optimized media data's frame index, for example, an optimized MP4 file's moov box, as well as parameters used to process the session. Further, seek state cache 930 may store a portion of the original streaming media data, for example, media data corresponding to a first one-second video. Seek state cache 930 can be combined with other components of proxy server 208, and can be located within, local to, or remote from proxy server 208.

In some embodiments, a streaming media application, for example, a media player, at user device 202 can perform media seeking locally. For example, if the desired media location has already been downloaded and is still available locally, the media player can jump the media playback to the new location without requiring any change in downloading the original media data. Otherwise, the media player may cancel original download and issue a new media download request to media server 212 to start downloading at a specific offset rather than at the beginning. The media player may then start downloading the new media segment starting at the desired offset, buffer a few seconds of media stream, and then begin playback at the desired media location.

To perform the media seeking at the user device, the media player may send a seek request for a URL different from that of an original request. For example, the media player may send a seek request with a byte offset (e.g., http://videoserver.com/myvideo?offset=45) instead of an original request (e.g., http://videoserver.com/myvideo). The seek request tells media server 212 to dynamically generate and send a new, complete streaming media data at the desired location. In light of the fact that a different URL is used and that a complete streaming media data, as opposed to partial streaming media data, is returned for the seek request, proxy server 208 may treat the returned streaming media data for the two media requests, i.e., the original request and the seek request, as completely independent streaming media data. This approach can operate with the above described budget encoding without any special handling.

In some embodiments, an alternative approach for the media player is to use a transport protocol, for example, such as hypertext transfer protocol (HTTP), to facilitate seek requests. Specifically, the media player may issue an HTTP range request to download the desired portion of the media data. For example, to skip directly to a $5000001^{st}$ byte of media data, the media player may issue a request for a same URL as an original request and include a HTTP header "Range: 5000000-." The range request, according to HTTP standards (RFC 2616), may return the desired bytes of the media. Thus, the media player may need to convert a user's specified time offset (e.g., 45 seconds) to a corresponding byte offset (e.g., 5000000), and issue a range request for a portion of the media starting at the $5000001^{st}$ byte offset. This kind of conversion can be implemented for media formats such as an MP4 file because the MP4 file already includes a complete index of all media frames in the media data.

Nevertheless, this alternative approach may not work with a real-time, on-the-fly modification process, e.g., budget encoding, because the byte range requested by the media player may correspond to a byte range in processed (e.g, optimized) media data, not a byte range in original media data. This means that proxy server 208 may not readily know what portion of the original media data the user is really requesting. And therefore, proxy server 208 may not readily know what portion of the original media data needs to be downloaded from media server 212, to be processed, and to be sent to user device 202. In addition, a frame index referencing all media frames in the media data may not be available in response to the range request, since such information may only be available at the beginning of the media data such as an MP4 file. Proxy server may need to re-download and re-process (e.g., re-optimize) the original media data starting from the beginning until it can be determined which portion of the processed (e.g., optimized) media was requested by the user.

In some embodiments, however, proxy server 208 may handle seek requests in the context of budget encoding by adopting more efficient methods than either of the above approaches. Proxy server 208 may convert a seek request with a range request for processed media data to a seek request with a range request for original media data, and forward the seek request with the range request for the original media data to media server 212. After receiving the requested range of the original media data, proxy server 208 may process, for example, transcode, compress, and/or optimize, the received original media data, and provide the processed media data to user device 202. With the information stored in seek state cache 930, proxy server 208 can setup BVP 300 to process the range request response.

Figure 10:
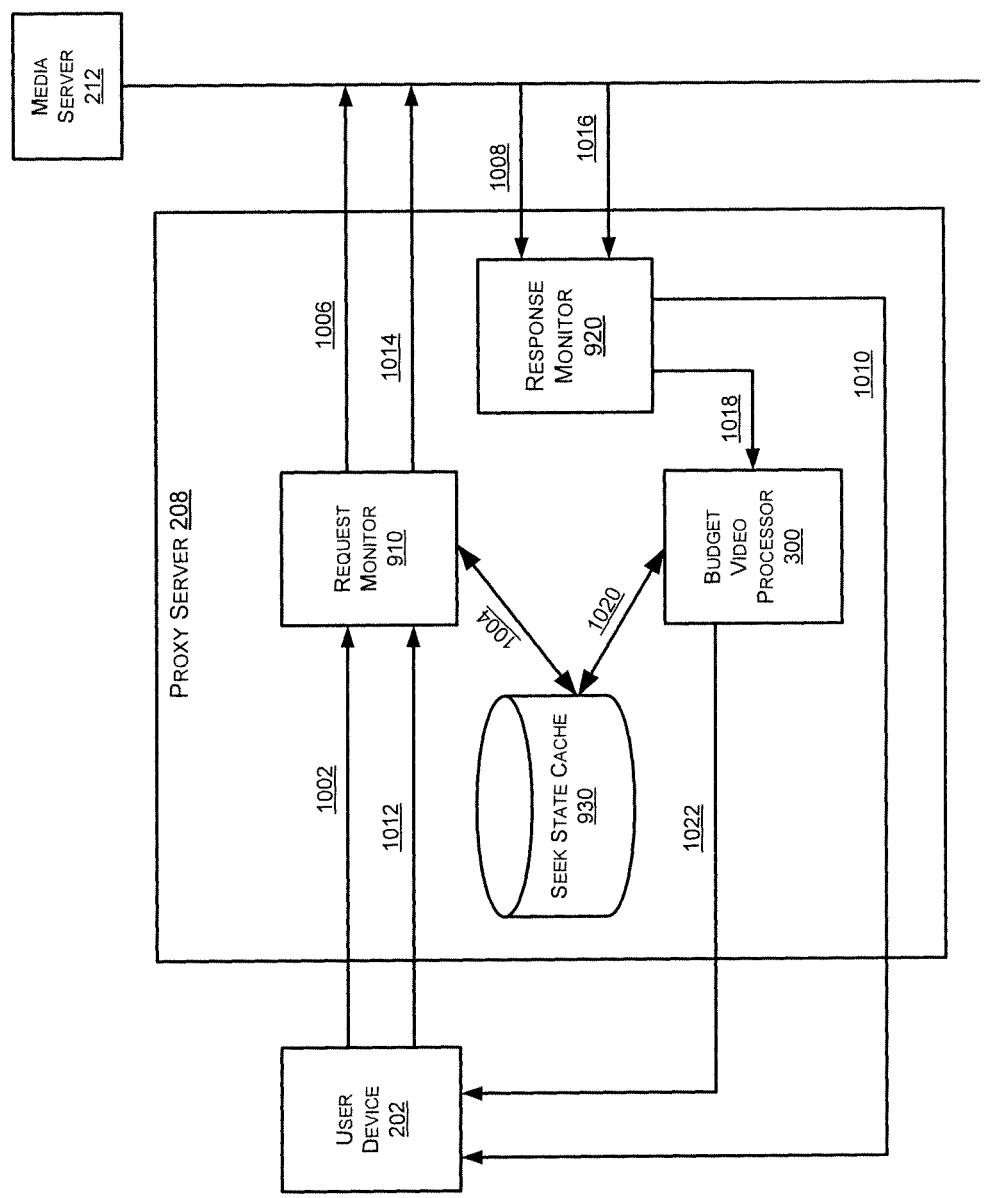
FIG. 10 is a functional diagram illustrating an exemplary process flow in the embodiment of FIG. 9.

FIG. 10 is a functional diagram illustrating an exemplary process flow in the embodiment of FIG. 9. Without departing from the exemplary embodiments, the exemplary process flow can be altered to delete steps, change the order of steps, or include additional steps.

In some embodiments, each time proxy server 208 can choose to apply budget encoding to particular media data, as previously described therein. Proxy server 208 can save in seek state cache 930 some state information associated with processing of the media data, just in case user device 202 later performs a seek. The specific state information saved in seek state cache 930 may include, but is not limited to, original media data's frame index (for example, an original MP4 file's moov section), processed/output media data's frame index (for example, an output MP4 file's moov section), and a portion of the original media data (for example, a first one-second of MP4 file). In some embodiments, proxy server 208 may provide a mechanism for aging the saved state information in seek state cache 930. For example, proxy server 208 may delete communication sessions (e.g., cookies) and the saved state information after a user logs out, when the user starts to watch another video, and/or after certain (e.g., 30) minutes of idle time, etc.

With reference to FIG. 10, after receiving (1002, 1012), from user device 202, a seek request with a byte range of media data, request monitor 910 performs a lookup (1004) in seek state cache 930 to determine if the seek request matches previously processed media data from an ongoing budget encoding session. The lookup may be based on the saved state information. If a match is not detected, request monitor 910 can forward (1006) the seek request to media server 212 without modification. After receiving (1008) the requested media data, response monitor 920 forwards (1010) the received media data to user device 202 without modification.

If a match is detected, request monitor 910 may use the saved state information to translate the requested byte range of the output media data to a byte range of corresponding original media data. For example, request monitor 910 may use information about frame sizes and byte offsets of output frames, in the saved copy of the output media data's moov section, to convert the requested byte range to a frame range, e.g., converting bytes 5000000-6000000 to frames 500-600 in the output media data. Request monitor 910 may use information about frame sizes and byte offsets of original frames, in the saved copy of the original media data's moov section, to convert the frame range of the output media data to a byte range in the original media data, e.g., converting frames 500-600 in the output media data to bytes 7000000-9000000 in the original media data. Then, request monitor 910 may use the byte range in the original media data to satisfy the HTTP request from user device 202, instead of the original byte range in the output media data. Request monitor 910 may adjust the seek request based on the byte range in the original media data, and forward (1014) the adjusted seek request to media server 212.

After receiving (1016) the requested media data, response monitor 920 may confirm that media server 212 responds with the requested portion of the media data. The confirmation may be based on the adjusted seek request and/or the saved state information in seek state cache 930. After the confirmation, response monitor 920 may transfer (1018) the received media data to budget video processor ("BVP") 300 for further processing.

BVP 300 may process, e.g., transcode, compress, optimize, and/or apply any other real-time, on-the-fly modification process to the received media data. During the processing, BVP 300 may retrieve (1020) and use the saved portion of the original media data to re-initialize its video decoder as if the entire media data had been processed from the beginning. BVP 300 may then process the received media data starting at desired location indicated in the adjusted seek request. BVP 300 may retrieve (1020) and use the saved copy of the output media data's moov section, without having to repeat the prediction step of the budget encoding algorithm as described previously therein. After the processing, BVP 300 may provide (1020) the processed media data to user device 202.

In some embodiments, the technique described herein may allow for seek state cache 930 to operate in a distributed manner, such as with multiple proxy servers. For example, an original request for media data from a user device may be assigned to a proxy server X, a first seek request for optimized media data from the user device may be assigned to a proxy server Y, and a second seek request for optimized media data from the user device may be assigned to a proxy server Z.

After receiving the original request, proxy server X may forward the request to a media server, receive original media data from the media server, optimize the original media data, and provide the optimized media data to the user device. Proxy server X may also save the state information (e.g., the original media data's frame index, the optimized media data's frame index, and a portion of the original media data) in a seek state cache.

Upon receiving the first seek request for the optimized media data, proxy server Y may re-direct the first seek request to proxy server X based on an URL, session information, and/or other information of the first seek request. Proxy server X may then process the first seek request based on the saved state information in the seek state cache, as described above.

After receiving the second seek request for the optimized media data, proxy server Z may re-direct the second seek request to proxy server X based on an URL, session information, and/or other information of the second seek request. Proxy server X may then process the second seek request based on the saved state information in the seek state cache, as described above.

Figure 11:
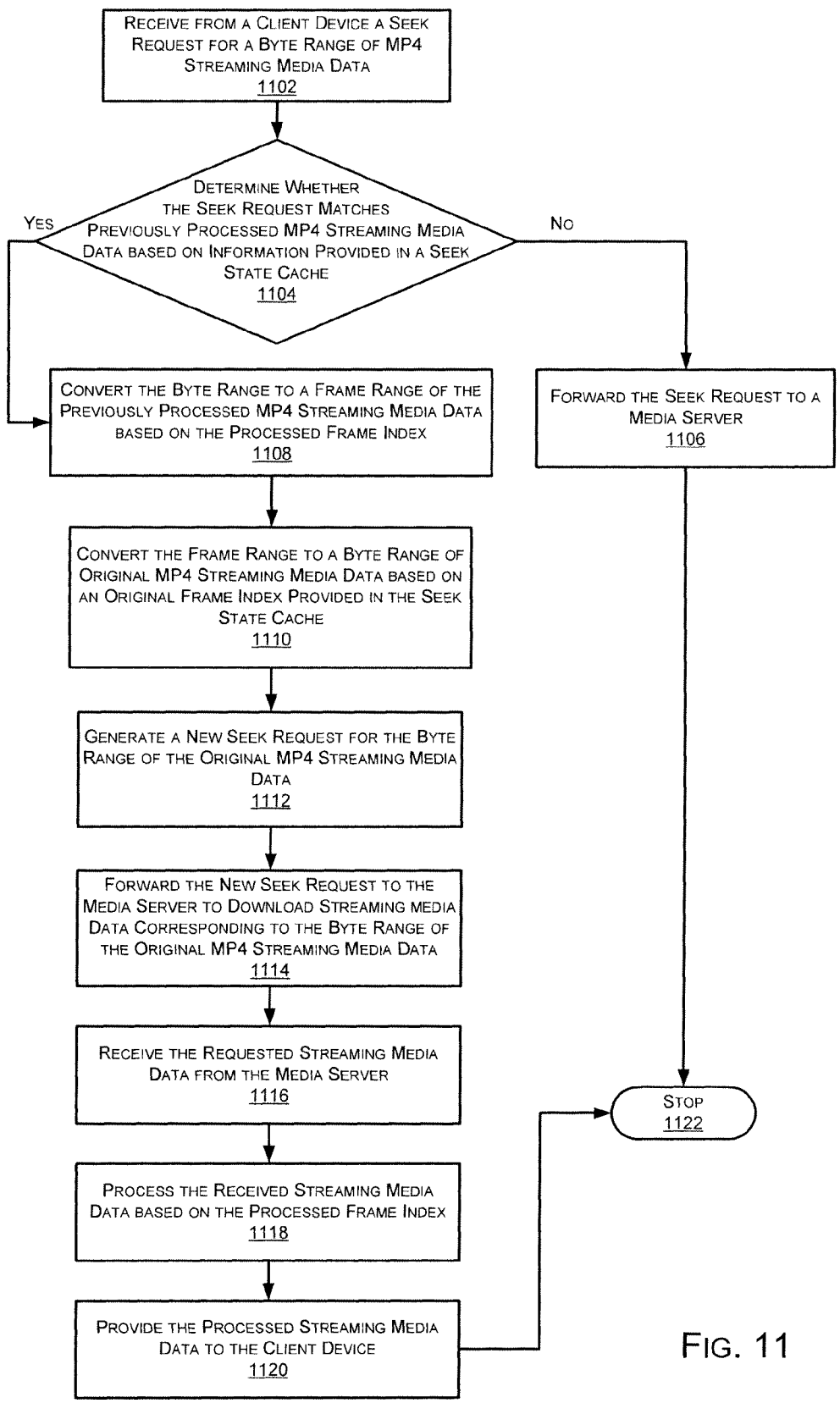
FIG. 11 is a flowchart representing an exemplary method for media seeking in context of budget encoding.

FIG. 11 is a flowchart representing an exemplary method for media seeking in context of budget encoding. Although MP4 streaming media data is used here to illustrate media seeking in the context of budget encoding, media seeking may be performed on any other media data, which has a frame index specifying a byte size and a byte offset for each media frame. Without departing from the exemplary embodiments, the exemplary process flow can be altered to delete steps, change the order of steps, or include additional steps.

After receiving (1102) from a user device a seek request for a byte range of MP4 streaming media data, a proxy server may determine (1104) whether the seek request matches previously processed MP4 streaming data based on information stored in a seek state cache. The seek state cache may store state information associated with processing the previously processed MP4 streaming media data. The state information may include, but is not limited to, the previously processed MP4 media data's frame index (e.g., a processed moov box), corresponding original MP4 streaming media data's frame index (e.g., an original moov box), and a portion of the original MP4 streaming media data. The determination (1104) may be based on the state information.

If match is not detected, the proxy server may forward (1106) the seek request to a media server to download requested range of the MP4 streaming media data. The method can then end (1122).

If match exists between the seek request and the looked-up, previously processed MP4 streaming media data, the proxy server can convert the seek request at the user device to a seek request at the media server. More specifically, the proxy server may convert (1108) the byte range to a frame range of the previously processed MP4 streaming media data. The conversion may be based on information about frame sizes and byte offsets of previously processed media frames, in the stored processed moov box of the previously processed MP4 streaming media data. The proxy server can then convert (1110) the frame range to a byte range in the corresponding original MP4 streaming media data. The conversion may be based on information about frame sizes and byte offsets of corresponding original media frames, in the stored original moov box of the corresponding original MP4 streaming media data.

Based on the byte range in the corresponding original MP4 streaming media data, the proxy server may generate (1112) a new seek request with the byte range in the corresponding original MP4 streaming media data. The proxy server can then forward (1114) the new seek request to the media server to download requested range of the original MP4 streaming media data.

After receiving (1116) the requested range of the original MP4 streaming media data from the media server, the proxy server may process (1118) the received range of the original MP4 streaming media data based on the stored processed moov box. The processing may include, for example, transcoding, compressing, optimizing, and/or applying any other real-time, on-the-fly modification process to the received streaming media data.

After the processing (1118), the proxy server may provide (1120) the processed range of the MP4 streaming media data to the client device. Then, the method can end (1122).

The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing budget encoding disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments may be apparent to those skilled in the art from consideration of the specification and practice of the invention disclosed herein.

What is claimed is:

1. A method for transcoding streaming video data, the method comprising:
   receiving, from a data network, encoded streaming media data including a plurality of media frames and a frame index specifying an original frame size and a byte offset of individual encoded frames of the plurality of media frames;
   allocating a frame budget for an output media frame to generate an output frame index, by estimating a frame size of the output media frame based on a respective original frame size in the frame index;
   generating the output media frame in real-time by processing the media frame based on first processing parameters;
   in response to the allocated frame budget being greater than a frame size of the processed media frame, padding the processed media frame;
   in response to the allocated frame budget being less than a frame size of the processed media frame, determining second processing parameters based on the frame budget and the first processing parameters, re-processing the media frame based on the second processing parameters and, in response to the allocated frame budget being greater than a frame size of the re-processed media frame, padding the re-processed media frame; and
   providing the output media frame.

2. The method of claim 1, further comprising:
   extracting the frame index referencing media frames presented in the streaming media data; and
   generating, before the output media frames are generated, the output frame index referencing the output media frames based on the allocated frame budgets and the frame index referencing the plurality of media frames.

3. The method of claim 1, further comprising:
   retrieving the media frame from the streaming media data based on the frame index;
   decoding the media frame; and
   obtaining the first processing parameters based on the decoded media frame.

4. The method of claim 3, wherein obtaining the first processing parameters includes obtaining one or more first quantization parameters used for quantizing the media frame.

5. The method of claim 1, wherein determining the second processing parameters includes determining one or more second quantization parameters for quantizing the media frame.

6. The method of claim 1, further comprising:
   compressing the output media frame using a lossless compression technique before a user device receives the output media frame.

7. The method of claim 6, further comprising:
   allocating the frame budget for the output media frame based on awareness of the compressing such that the chance for the processed media frame to fit within the frame budget is improved.

8. A device coupled to receive streaming media data having a plurality of media frames and a frame index specifying an original frame size and a byte offset of individual encoded frames of the plurality of media frames, the device comprising:
- a frame budget algorithm module configured to allocate a frame budget for an output media frame to generate an output frame index, by estimating a frame size of the output media frame based on a respective original frame size of a respective encoded frame in the received frame index;
- a processing algorithm module configured to determine first processing parameters based on the frame budget and the media frame, and determine, if the output frame does not fit within the frame budget, second processing parameters based on the frame budget and the first processing parameters;
- a processing module configured to process the media frame based on the first processing parameters;
- a frame padder configured to pad the processed media frame to generate the output media frame; and
- a frame writer configured to provide the output media frame.

9. The device of claim 8, further comprising:
a media reader configured to receive the frame index referencing media frames presented in the streaming media data.

10. The device of claim 9, wherein each output media frame has a corresponding frame budget.

11. The device of claim 8, further comprising:
an output-frame-index generator configured to generate, before the output media frames are generated, the output frame index referencing the output media frames based on the allocated frame budgets and the frame index referencing the plurality of media frames.

12. The device of claim 11, the output-frame-index generator is further configured to:
update the output frame index based on configuration information of the encoder.

13. The device of claim 8, further comprising:
a decoder configured to decode the media frame, and obtain information from the decoded media frame to facilitate the processing algorithm module to determine the first processing parameters.

14. The device of claim 8, the processing algorithm module is further configured to:
determine one or more first quantization parameters for quantizing the media frame.

15. The device of claim 8, the processing algorithm module is further configured to:
determine one or more second quantization parameters for quantizing the media frame.

16. The device of claim 8, the processing module is further configured to:
re-processing the media frame based on the second processing parameters such that the re-processed media frame fits within the frame budget.

17. A non-transitory computer readable medium storing instructions that, when executed, cause a computer to perform a method for transcoding streaming video data, the method, the method comprising:
- receiving, from a data network, encoded streaming media data including a plurality of media frames and a frame index specifying an original frame size and a byte offset of individual encoded frames of the plurality of media frame;
- allocating a frame budget for an output media frame to generate an output frame index, by estimating a frame size of the output media frame based on a respective original frame size in the frame index;
- generating the output media frame in real-time by processing the media frame based on first processing parameters;
- if the allocated frame budget is greater than a frame size of the processed media frame, padding the processed media frame;
- if the allocated frame budget is less than a frame size of the processed media frame, determining second processing parameters based on the frame budget and the first processing parameters, re-processing the media frame based on the second processing parameters and, if the allocated frame budget is greater than a frame size of the re-processed media frame, padding the re-processed media frame; and
- providing the output media frame.

* * * * *